(12) United States Patent
Takabayashi et al.

(10) Patent No.: US 11,088,426 B2
(45) Date of Patent: Aug. 10, 2021

(54) ELECTRIC STORAGE DEVICE

(71) Applicants: SANYO Electric Co., Ltd., Daito (JP); Panasonic Corporation, Kadoma (JP)

(72) Inventors: Hiroshi Takabayashi, Hyogo (JP); Naofumi Nakata, Hyogo (JP)

(73) Assignees: SANYO Electric Co., Ltd., Daito (JP); PANASONIC CORPORATION, Kadoma (JP)

( * ) Notice: Subject to any disclaimer, the term of this patent is extended or adjusted under 35 U.S.C. 154(b) by 0 days.

(21) Appl. No.: 16/267,891

(22) Filed: Feb. 5, 2019

(65) Prior Publication Data

US 2019/0305286 A1 Oct. 3, 2019

(30) Foreign Application Priority Data

Mar. 29, 2018 (JP) .............................. JP2018-065041

(51) Int. Cl.
*H01M 2/26* (2006.01)
*H01M 10/04* (2006.01)
*H01M 50/54* (2021.01)

(52) U.S. Cl.
CPC ....... *H01M 50/54* (2021.01); *H01M 10/0413* (2013.01)

(58) Field of Classification Search
CPC .......................... H01M 2/266; H01M 10/0413
See application file for complete search history.

(56) References Cited

U.S. PATENT DOCUMENTS

2015/0188146 A1\* 7/2015 Shinto ..................... H01M 4/70
429/211

FOREIGN PATENT DOCUMENTS

JP 2010-80393 A 4/2010

\* cited by examiner

*Primary Examiner* — Osei K Amponsah
(74) *Attorney, Agent, or Firm* — Westerman, Hattori, Daniels & Adrian, LLP (57) ABSTRACT

An electric storage device includes an electrode body including a plurality of first electrode plates and a plurality of second electrode plates, a first electrode output terminal, a second electrode output terminal, a first current collector, and a second current collector. The first electrode plates have first tabs that protrude from the electrode body and have conductivity and are connected to the first current collector. The first tabs are stacked to form a first tab stack, one surface of the first tab stack is in contact with the first current collector, and a first protective sheet is disposed on and in contact with the other surface on the side opposite to the one surface. On the periphery of the first protective sheet, there is a corner formed by two adjacent sides. At least the corner of the first protective sheet is joined to the first tab stack.

9 Claims, 7 Drawing Sheets

ELECTRIC STORAGE DEVICE

CROSS REFERENCE TO RELATED APPLICATIONS

The present invention application claims priority to Japanese Patent Application No. 2018-065041 filed in the Japan Patent Office on Mar. 29, 2018, the entire contents of which are incorporated herein by reference.

BACKGROUND OF THE INVENTION

Field of the Invention

The present invention relates to an electric storage device.

Description of Related Art

Electric storage devices are used as power sources for driving electric vehicles (EV) and hybrid electric vehicles (HEV and PHEV), as well as for electronic devices. As the electric storage device, for example, an alkaline secondary battery or a nonaqueous electrolyte secondary battery is used.

These electric storage devices include, for example, an electrode body including a positive electrode plate, a negative electrode plate, and a separator, an outer casing accommodating the electrode body, a lid covering the opening of the outer casing, an electrode terminal connected to one of the electrode plates of the electrode body and passing through an insertion hole provided in the lid, and a tab extending from the electrode body toward the lid and electrically connected to the electrode terminal.

Japanese Published Unexamined Patent Application No. 2010-80393 (Patent Document 1) discloses an electric storage device including current collecting tabs extending from a positive or negative electrode of an electrode body, stacked, and made of aluminum or an aluminum alloy, a protective lead joined to the outermost one of the current collecting tabs to prevent the current collecting tabs from breaking, and a conductive member to which the current collecting tabs are joined, wherein the current collecting tabs are ultrasonically joined to the conductive member together with the protective lead.

In the above-described electric storage device, the breakage of the current collecting tabs is suppressed by the protective lead. However, when joining is performed by pressing a joining device such as an ultrasonic joining device against the current collecting tabs with the protective lead therebetween, a part of the protective lead that is not in contact with the joining device may warp in the direction away from the current collecting tabs.

When the distance between the joint of the protective lead and the electrode body is reduced in order to reduce the empty space in the outer casing, this warpage may cause a short circuit between the electrode body and the protective lead.

BRIEF SUMMARY OF THE INVENTION

It is therefore an object of the present invention to provide an electric storage device having current collecting tabs and a protective lead that are joined together with higher reliability.

In an aspect of the present invention, an electric storage device includes an electrode body including a plurality of first electrode plates and a plurality of second electrode plates, a first electrode output terminal and a second electrode output terminal, a first current collector electrically connecting the first electrode plates and the first electrode output terminal, and a second current collector electrically connecting the second electrode plates and the second electrode output terminal. The first electrode plates have first tabs that protrude from the electrode body and have conductivity and are connected to the first current collector. The first tabs are stacked to form a first tab stack, one surface of the first tab stack is in contact with the first current collector, and a first protective sheet is disposed on and in contact with the other surface on the side opposite to the one surface. On the periphery of the first protective sheet, there is a corner formed by two adjacent sides. At least the corner of the first protective sheet is joined to the first tab stack. The corner here includes a rounded one in which the intersection of two sides is cut off, and there may be a plurality of corners.

According to the present disclosure, warping of the protective sheet caused when the tab is joined to the current collector together with the protective sheet is suppressed, and it is possible to suppress short-circuiting due to contact between the protective sheet and the electrode body.

DETAILED DESCRIPTION OF THE INVENTION

Hereinafter, embodiments of the present invention will be described in detail with reference to the drawings. The following description of preferred embodiments is merely exemplary in nature and is not intended to limit the invention, its application, or uses. In the following drawings, components having substantially the same functions are denoted by the same reference numerals for the sake of brevity of description.

Embodiments

Figure 1:
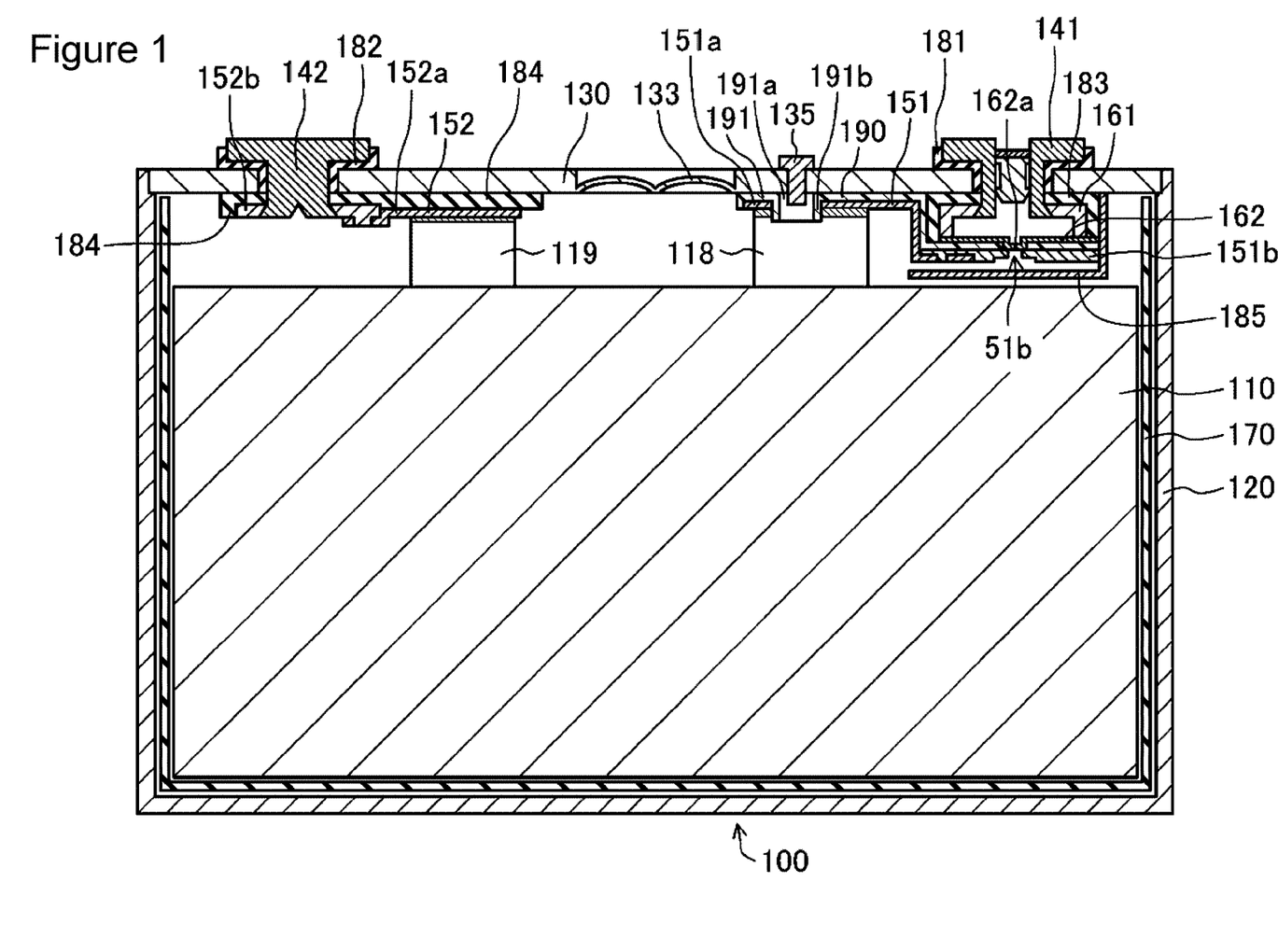
FIG. 1 is a front cross-sectional view of an electric storage device of the present disclosure.

FIG. 1 is a cross-sectional view of an electric storage device 100 according to an embodiment of the present invention. As shown in FIG. 1, the electric storage device 100 includes an electrode body 110 including positive electrode plates, negative electrode plates, and separators, a bottomed prismatic outer casing 120 accommodating the electrode body 110 and having an opening, and a lid 130 sealing the opening of the outer casing 120.

The outer casing 120 and the lid 130 are each preferably made of metal, for example, aluminum or aluminum alloy. The electrode body 110 includes a plurality of positive electrode plates and a plurality of negative electrode plates stacked alternately with separators therebetween. The electrode body 110 is accommodated in the outer casing 120 together with electrolyte (not shown). An insulating sheet 170 is interposed between the electrode body 110 and the outer casing 120.

Figure 2A:
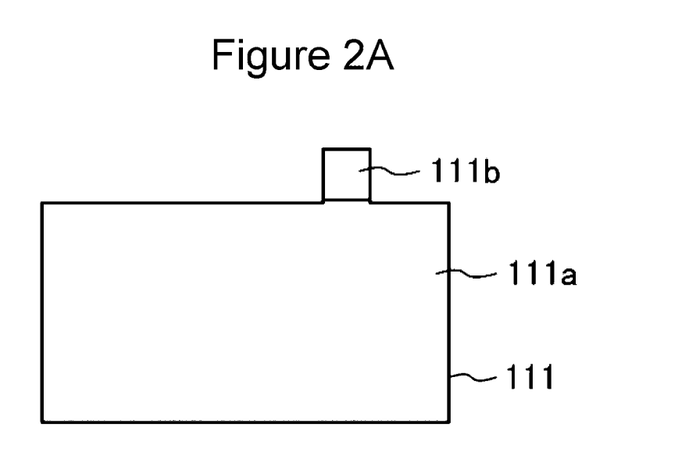
FIG. 2A is a plan view of a positive electrode plate used in the electric storage device of the present disclosure.
Figure 2B:
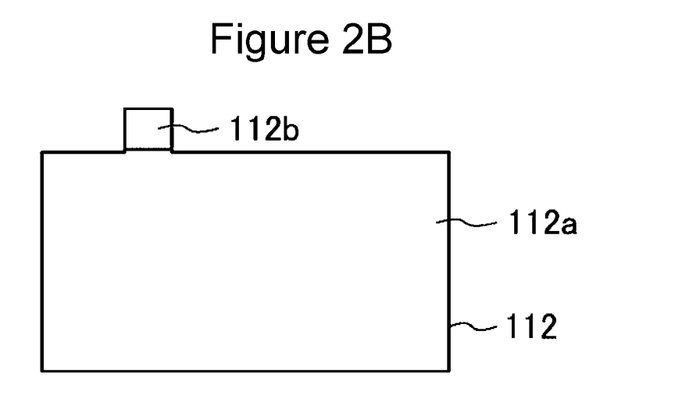
FIG. 2B is a plan view of a negative electrode plate used in the electric storage device of the present disclosure.

FIG. 2A is a plan view showing a positive electrode plate (first electrode plate) 111 of the electric storage device 100, and FIG. 2B is a plan view showing a negative electrode plate (second electrode plate) 112 of the electric storage device 100.

As shown in FIG. 2A, the positive electrode plate 111 has a main body portion 111a of the positive electrode plate in which active material mixture layers are formed on both sides of a rectangular core body. The positive electrode plate is provided with a tab 111b (first tab). A part of the core body of the positive electrode protrudes from the end side of the main body portion 111a, and the protruding part of the core body forms the tab 111b. The tab 111b may be a part of the core body as shown in FIG. 2A, or another member may be connected to the core body of the positive electrode to form the tab 111b. A protective layer having a larger electric resistance than that of the active material mixture layer is preferably provided in a part of the tab 111b adjacent to the active material mixture layer. The protective layer preferably contains ceramic particles such as alumina, silica, and zirconia, and a binder. It is further preferable that the protective layer contain conductive particles such as a carbon material.

A method for manufacturing the positive electrode plate 111 will be described. A positive electrode slurry containing lithium nickel cobalt manganese complex oxide as an active material contained in the active material mixture layer, polyvinylidene fluoride (PVdF) as a binder, a carbon material as a conductive agent, and N-methyl-2-pyrrolidone (NMP) as a dispersion medium is prepared. The slurry is applied to both sides of a rectangular aluminum foil having a thickness of 15 µm as a core body. By drying the slurry, N-methyl-2-pyrrolidone in the slurry is removed, and active material mixture layers are formed on the core body. Thereafter, the active material mixture layers are compressed to a predetermined thickness. The positive electrode plate thus obtained is cut into a predetermined shape.

As shown in FIG. 2B, the negative electrode plate 112 has a main body portion 112a of the negative electrode plate in which active material mixture layers are formed on both sides of a rectangular core body. The negative electrode plate is provided with a tab 112b (second tab). A part of the core body of the negative electrode protrudes from the end side of the main body portion 112a, and the protruding part of the core body forms the tab 112b. The tab 112b may be a part of the core body, or another member may be connected to the core body to form the tab 112b.

A method for making the negative electrode plate 112 will be described. A slurry containing graphite as an active material of the active material mixture layer, styrene butadiene rubber (SBR) as a binder, carboxymethyl cellulose (CMC) as a thickener, and water is prepared. The slurry is applied to both sides of a rectangular copper foil having a thickness of 8 µm as a core body of the negative electrode. By drying the slurry, water in the slurry is removed, and active material mixture layers are formed on the core body. Thereafter, the active material mixture layers are compressed to a predetermined thickness. The negative electrode plate thus obtained is cut into a predetermined shape.

50 positive electrode plates and 51 negative electrode plates are made by the above-described method, and these plates are stacked with rectangular separators made of polyolefin therebetween to make a stack-type electrode body 110. At one end of the stack-type electrode body 110, a first tab stack 118 is formed by stacking the tabs 111b of the positive electrode plates and a second tab stack 119 is formed by laminating the tabs 112b of the negative electrode plates. Separators are disposed on both outer surfaces of the electrode body 110, and the electrode plates and separators can be fixed in a stacked state with a tape or the like. Alternatively, the separator may be provided with an adhesive layer so that the separator and the positive electrode plate are bonded to each other, and the separator and the negative electrode plate are bonded to each other.

The electric storage device 100 further includes a positive electrode terminal (first electrode output terminal) 141 and a negative electrode terminal (second electrode output terminal) 142 passing through holes of the lid 130, a positive electrode current collector (first current collector) 151 for electrically connecting the positive electrode terminal 141 and the electrode body 110, a negative electrode current collector (second current collector) 152 for electrically connecting the negative electrode terminal 142 and the electrode body 110, and a safety device for electrically connecting the positive electrode current collector 151 and the positive electrode terminal 141.

The first tab stack 118 of the positive electrode and the second tab stack 119 of the negative electrode are provided at the end of the electrode body 110 on the side of the lid 130. The first tab stack 118 is connected to the positive electrode current collector 151, and the second tab stack 119 is connected to the negative electrode current collector 152.

The positive electrode current collector 151 includes a positive electrode first current collecting plate 151a connected to the first tab stack 118, and a positive electrode second current collecting plate 151b connected to the positive electrode first current collecting plate 151a and connected to the safety device. The positive electrode first current collecting plate 151a and the positive electrode second current collecting plate 151b are connected to each other by overlapping their edges and welding them together.

The negative electrode current collector 152 includes a negative electrode first current collecting plate 152a connected to the second tab stack 119, and a negative electrode second current collecting plate 152b connected to the negative electrode first current collecting plate 152a and connected to the negative electrode terminal 142. The negative electrode first current collecting plate 152a and the negative electrode second current collecting plate 152b are connected to each other by overlapping their edges and welding them together.

The positive electrode terminal 141 is fixed to the lid 130 with an outer insulating member 181 made of resin therebetween. The negative electrode terminal 142 is fixed to the lid 130 with an outer insulating member 182 made of resin therebetween. The positive electrode terminal 141 and the negative electrode terminal 142 are made of, for example, metal. More specifically, the positive electrode terminal 141 is made of, for example, aluminum or an aluminum alloy, and the negative electrode terminal 142 is made of, for example, copper or a copper alloy. It is more preferable that the negative electrode terminal 142 have a part made of copper or a copper alloy on the inner side of the outer casing 120 and a part made of aluminum or an aluminum alloy on the outer side of the outer casing 120. The surface of the negative electrode terminal 142 is preferably coated with nickel plating or the like. A hole is formed in the negative electrode second current collecting plate 152b, and the negative electrode terminal 142 is inserted into this hole, and the negative electrode second current collecting plate 152b is fixed to the lid 130 by caulking the lower end part of the negative electrode terminal 142. When the negative electrode second current collecting plate 152b is fixed to the lid 130, an insulating plate 184 is interposed between the negative electrode second current collecting plate 152b and the lid 130. The insulating plate 184 extends so as to be interposed also between the negative electrode first current collecting plate 152a and the lid 130.

The safety device is, for example, a current interrupting mechanism that operates when the pressure in the outer casing 120 becomes equal to or higher than a predetermined value and blocks the conductive path between the positive electrode plates of the electrode body 110 and the positive electrode terminal 141.

The safety device has a bowl-shaped conductive member 161 fixed to the positive electrode terminal 141, and an inverting plate 162 connected to the conductive member 161 and connected to the positive electrode second current collecting plate 151b. The conductive member 161 has a hole in the bottom part of the bowl, and the lower part of the positive electrode terminal 141 is inserted into this hole, and the lower part is caulked, so that the conductive member 161 is fixed to the lid 130 together with the positive electrode terminal 141. When the conductive member 161 is fixed to the lid 130, an insulating plate 183 is interposed between the conductive member 161 and the lid 130. The inverting plate 162 is a disk having a protrusion 162a at its center. The inverting plate 162 is disposed so as to cover the opening on the lower side of the conductive member 161, and the periphery of the inverting plate 162 and the opening end of the conductive member 161 are joined by welding. The protrusion 162a of the inverting plate 162 is connected to a hole 51b provided in the positive electrode second current collecting plate 151b in a state of being fitted. The protrusion 162a is not necessarily fitted into the hole 51b, and the protrusion 162a may be joined and connected to the surface of the positive electrode second current collecting plate 151b that faces the lid 130.

The safety device may be provided in the conductive path between the negative electrode plates of the electrode body 110 and the negative electrode terminal 142. The conductive member 161 and the inverting plate 162 are made of metal. When they are connected to the positive electrode terminal 141, they are made of, for example, aluminum or an aluminum alloy. When they are connected to the negative electrode terminal 142, they are made of, for example, copper or a copper alloy.

Although the electric storage device 100 preferably includes a safety device, the safety device is not essential in the present invention.

The lid 130 is provided with an exhaust valve 133 that breaks when the pressure in the outer casing 120 exceeds a predetermined value, and discharges the gas in the outer casing 120 to the outside of the outer casing 120. The operating pressure of the exhaust valve 133 is set to a value higher than the operating pressure of the safety device.

The lid 130 is further provided with an injection hole. After the electrolyte is injected into the outer casing 120 through the injection hole, the injection hole is sealed with a plug 135.

In this embodiment, the electrode body 110 used in the electric storage device 100 is composed of two electrode bodies 110a and 110b made by the above-described method. The two electrode bodies 110a and 110b may have the same configuration or different configurations.

Figure 3:
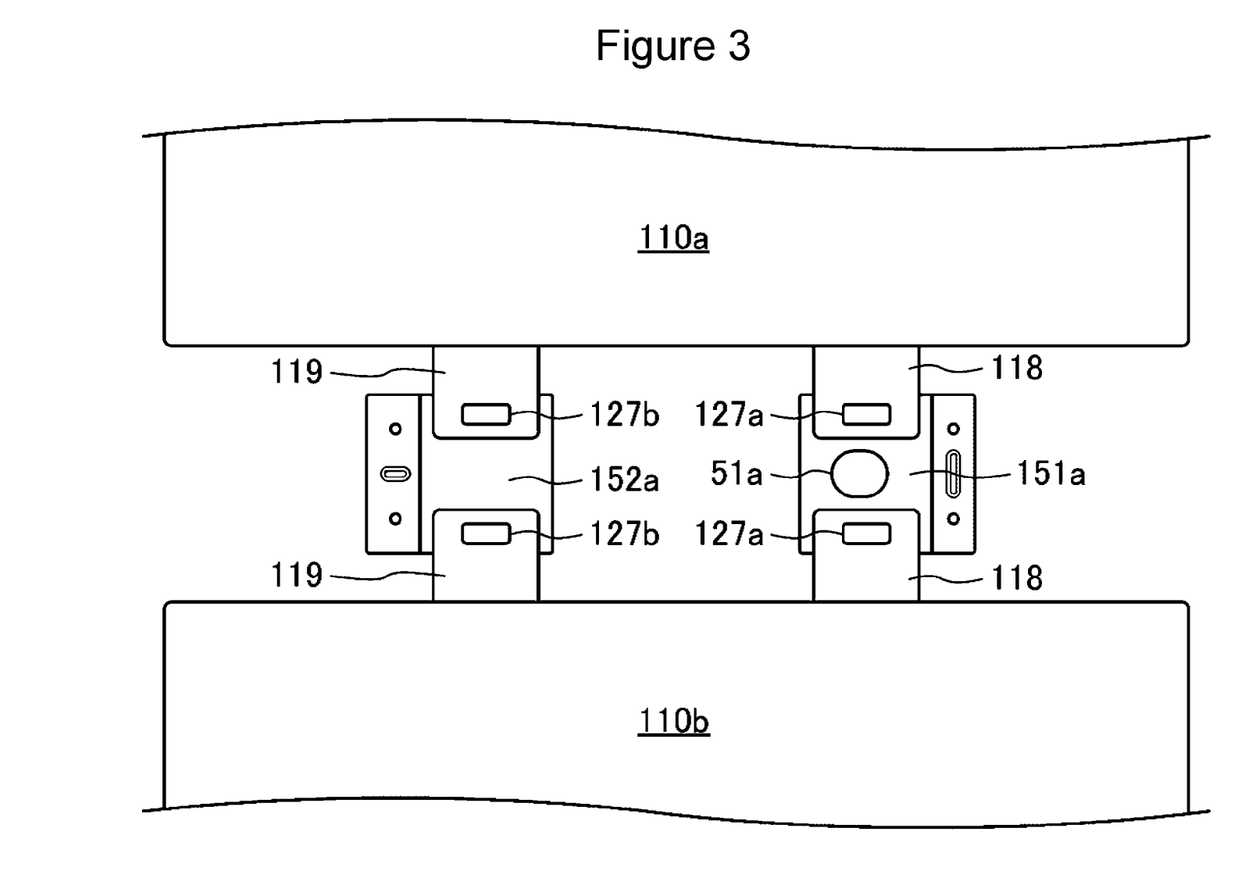
FIG. 3 is a front view showing the step of connecting the tab group and the current collecting plate of the electric storage device of the present disclosure.

FIG. 3 is a plan view showing the first tab stacks 118, the second tab stacks 119, the positive electrode first current collecting plate 151a and the negative electrode first current collecting plate 152a in the connecting step of the electric storage device 100.

The positive electrode first current collecting plate 151a and the negative electrode first current collecting plate 152a are disposed between the electrode body 110a and the electrode body 110b.

The first tab stack 118 and the second tab stack 119 protruding from the electrode body 110a are respectively disposed on the positive electrode first current collecting plate 151a, which is a part of the positive electrode current collector 151, and the negative electrode first current collecting plate 152a, which is a part of the negative electrode current collector 152. One surface of the first tab stack 118 is brought into contact with the positive electrode first current collecting plate 151a, and one surface of the second tab stack 119 is brought into contact with the negative electrode first current collecting plate 152a.

The first tab stack 118 and the second tab stack 119 protruding from the electrode body 110b are respectively disposed on the positive electrode first current collecting plate 151a, which is a part of the positive electrode current collector 151, and the negative electrode first current collecting plate 152a, which is a part of the negative electrode current collector 152. One surface of the first tab stack 118 is brought into contact with the positive electrode first current collecting plate 151a, and one surface of the second tab stack 119 is brought into contact with the negative electrode first current collecting plate 152a.

The first tab stacks 118 of the electrode bodies 110a and 110b are each welded to the positive electrode first current collecting plate 151a together with a protective sheet disposed on the surface opposite to the surface in contact with the positive electrode first current collecting plate 151a to form a joint region 127a (positive electrode joint region). The second tab stacks 119 of the electrode bodies 110a and 110b are each welded to the negative electrode first current collecting plate 152a together with a protective sheet disposed on the surface opposite to the surface in contact with the negative electrode first current collecting plate 152a to form a joint region 127b (negative electrode joint region).

After that, the part where the first tab stack 118 and the positive electrode first current collecting plate 151a are joined together and the part where the second tab stack 119 and the negative electrode first current collecting plate 152*a* are joined together are curved such that the two electrode bodies 110*a* and 110*b* are substantially parallel to each other and placed in the outer casing 120.

That is, the first tab stacks 118 are connected to the surface of the positive electrode first current collecting plate 151*a* that faces the electrode body 110, and the first tab stacks 118 are curved. Therefore, the secondary battery has a higher energy density. The second tab stacks 119 are connected to the surface of the negative electrode first current collecting plate 152*a* that faces the electrode body 110, and the second tab stacks 119 are curved. The space between the positive electrode current collector 151, the negative electrode current collector 152 and the electrode body 110 can be reduced, and the secondary battery has a higher energy density.

Figure 4:
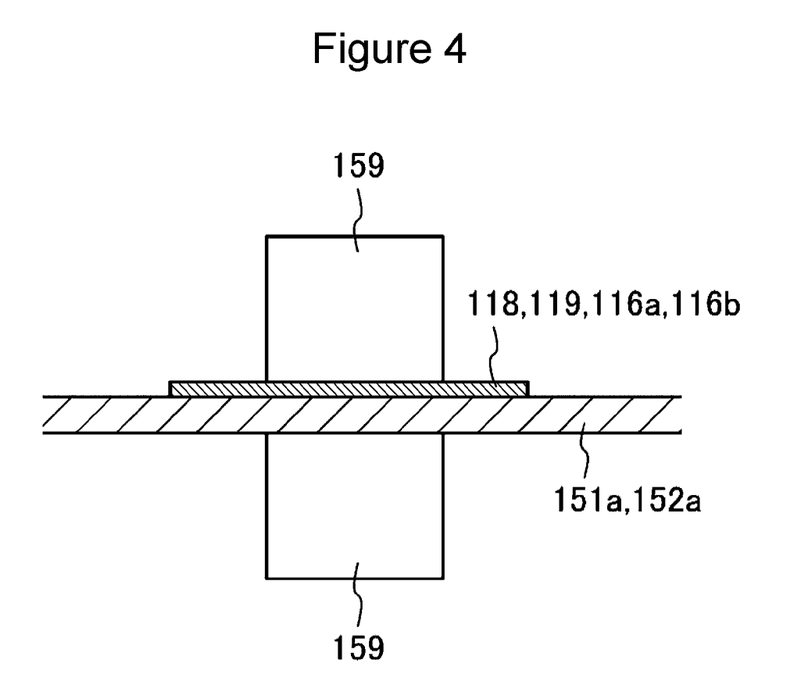
FIG. 4 is a diagram showing the tab stack, the current collecting plate and welding jigs in the connecting step of the electric storage device of the present disclosure.

FIG. 4 is a diagram showing the first tab stack 118, the second tab stack 119, the protective sheet 116*a*, 116*b*, and welding jigs 159 in the connecting step of the electric storage device 100.

Welding is preferably performed as follows.

As shown in FIG. 4, the first tab stack 118 or the second tab stack 119 and the current collector (the positive electrode first current collecting plate 151*a* or the negative electrode first current collecting plate 152*a*) are sandwiched from above and below by the welding jigs 159, and welding is performed. In FIG. 4, the first tab stack 118 and the protective sheet (first protective sheet) 116*a* are integrally shown, and the second tab stack 119 and the protective sheet (second protective sheet) 116*b* are integrally shown.

The welding method is preferably ultrasonic welding or resistance welding. Thereby, the first tab stack 118 and the positive electrode first current collecting plate 151*a* are welded together more securely, and the second tab stack 119 and the negative electrode first current collecting plate 152*a* are welded together more securely.

When the number of stacked tabs is large, for example, when the number of stacked tabs is 20 or more, ultrasonic welding or resistance welding can form a welded joint with higher reliability in comparison with laser welding or the like because welding can be performed in a state in which the tab stack is sandwiched between a pair of welding jigs 159.

The pair of welding jigs 159 are a pair of resistance welding electrodes in the case of resistance welding, and a horn and an anvil in the case of ultrasonic welding. The first tab stack 118 of the electrode body 110*a* is connected to one side of the central part of the positive electrode first current collecting plate 151*a* in the width direction of the positive electrode first current collecting plate 151*a*. The first tab stack 118 of the electrode body 110*b* is connected to the other side of the central part of the positive electrode first current collecting plate 151*a* in the width direction of the positive electrode first current collecting plate 151*a*. The second tab stack 119 of the electrode body 110*a* is connected to one side of the central part of the negative electrode first current collecting plate 152*a* in the width direction of the negative electrode first current collecting plate 152*a*. The second tab stack 119 of the electrode body 110*b* is connected to the other side of the central part of the negative electrode first current collecting plate 152*a* in the width direction of the negative electrode first current collecting plate 152*a*.

A hole 51*a* is provided in the positive electrode first current collecting plate 151*a*. After the positive electrode first current collecting plate 151*a* is connected to the positive electrode second current collecting plate 151*b*, the hole 51*a* is disposed at a position corresponding to the injection hole of the lid 130. The first tab stack 118 of the electrode body 110*a* is connected to one side of the hole 51*a* in the width direction of the positive electrode first current collecting plate 151*a*. The first tab stack 118 of the electrode body 110*b* is connected to the other side of the hole 51*a* in the width direction of the positive electrode first current collecting plate 151*a*.

It is preferable that when the positive electrode first current collecting plate 151*a* and the first tab stacks 118 of the electrode bodies 110*a* and 110*b* are viewed from the direction perpendicular to the lid 130, parts of the first tab stacks 118 of the electrode bodies 110*a* and 110*b* disposed substantially parallel to the positive electrode first current collecting plate 151*a* do not overlap with the hole 51*a*. Thereby, it is possible to prevent the positive electrode first current collecting plate 151*a* or the first tab stacks 118 of the electrode bodies 110*a* and 110*b* from interfering with electrolyte injection.

Either of the fixing step of fixing the positive electrode second current collecting plate 151*b* and the negative electrode second current collecting plate 152*b* to the lid 130 and the connecting step of connecting the first tab stacks 118 and the second tab stacks 119 to the positive electrode first current collecting plate 151*a* and the negative electrode first current collecting plate 152*a*, respectively, may be performed first.

An example of ultrasonic welding will now be described with reference to FIGS. 5A, 5B, 6A and 6B. In order to make the figures easier to read, only part of the positive electrode first current collecting plate 151*a* or the negative electrode first current collecting plate 152*a* that is joined to the first tab stack 118 or the second tab stack 119 is shown. Other members attached to the outer peripheral part of the positive electrode first current collecting plate 151*a* or the negative electrode first current collecting plate 152*a* are omitted.

Figure 5A:
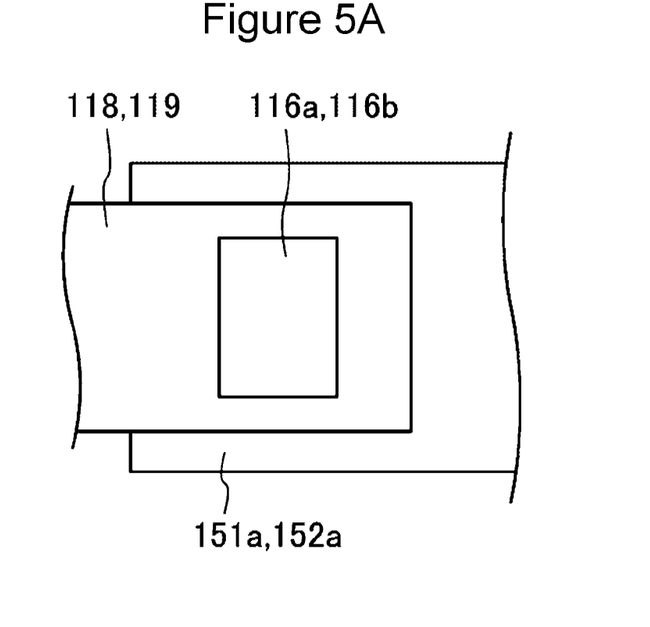
FIG. 5A is a schematic plan view showing the protective sheet, the tab stack and the current collecting plate before joining of the electric storage device of the present disclosure.
Figure 5B:
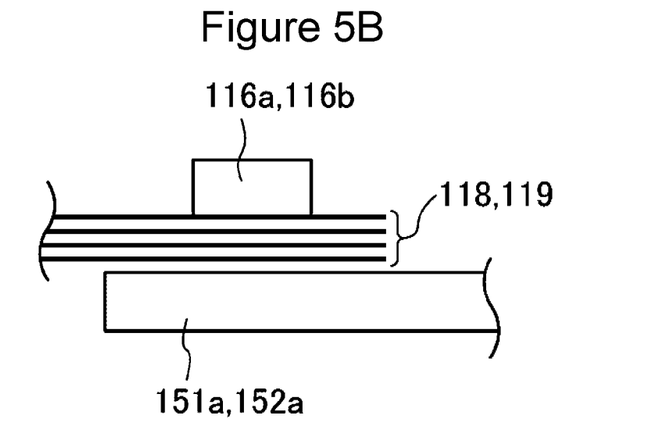
FIG. 5B is a schematic side view showing the protective sheet, the tab stack and the current collecting plate before joining of the electric storage device of the present disclosure.
Figure 6A:
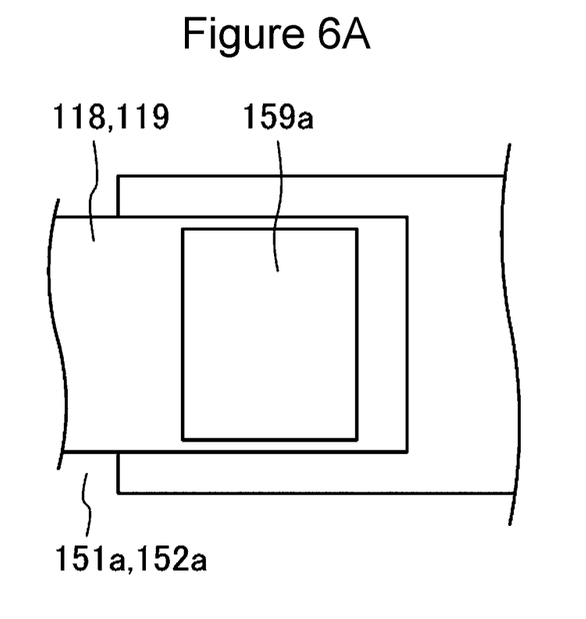
FIG. 6A is a schematic plan view showing the protective sheet, the tab stack and the current collector after joining of the electric storage device of the present disclosure.
Figure 6B:
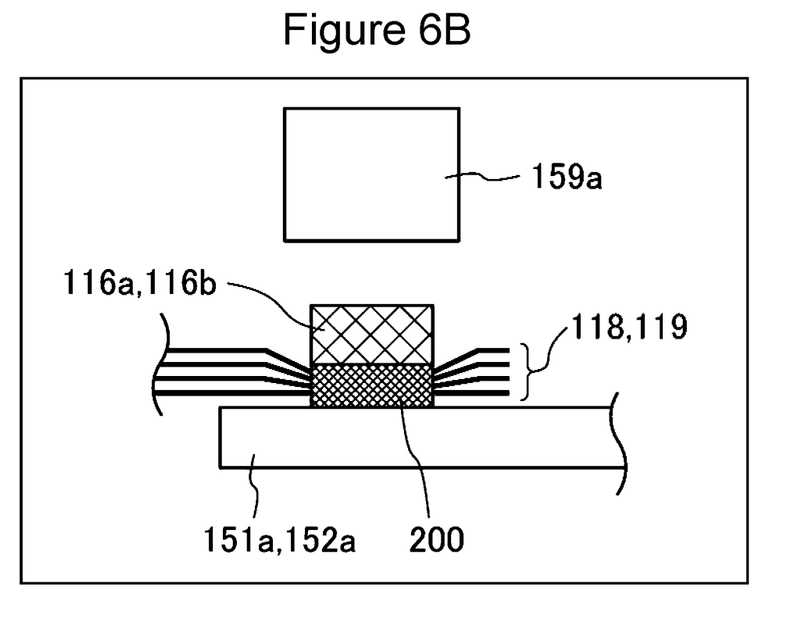
FIG. 6B is a schematic side view showing the protective sheet, the tab stack and the current collector after joining of the electric storage device of the present disclosure.

As shown in FIGS. 5A and 5B, in preparation for connection, the first tab stack 118 or the second tab stack 119 is placed on the positive electrode first current collecting plate 151*a* or the negative electrode first current collecting plate 152*a*, and the first protective sheet 116*a* or the second protective sheet 116*b* is placed thereon. Then, as shown in FIGS. 6A and 6B, an ultrasonic horn 159*a* is pressed against the first protective sheet 116*a* or the second protective sheet 116*b* from above to perform welding Here, the ultrasonic horn 159*a* covers the entire upper surface of the first protective sheet 116*a* or the second protective sheet 116*b* and extends beyond the periphery thereof. By welding with ultrasonic waves, the first tab stack 118 or the second tab stack 119 is welded to the positive electrode first current collecting plate 151*a* or the negative electrode first current collecting plate 152*a*, and the plurality of tabs are also welded together to form a welded portion 200. In the welded portion 200, the positive electrode first current collecting plate 151*a* or the negative electrode first current collecting plate 152*a* and the first tab stack 118 or the second tab stack 119 are welded together.

Figure 7A:
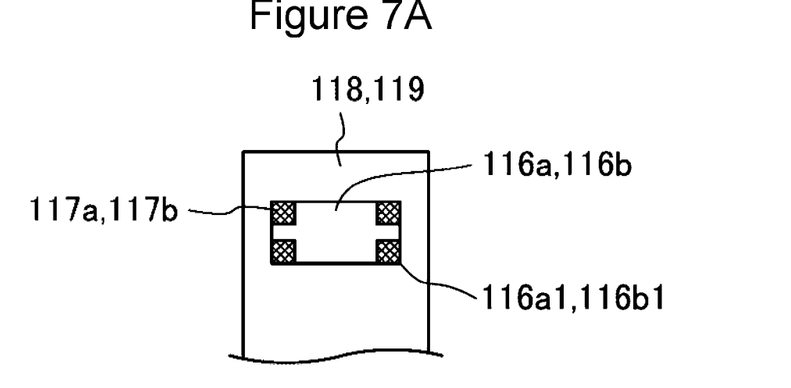
FIG. 7A is a plan view showing the protective sheet and the tab stack used in the electric storage device of the present disclosure.
Figure 7B:
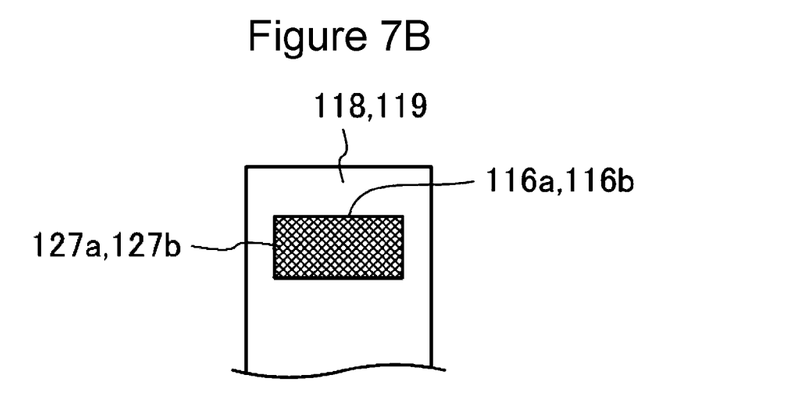
FIG. 7B is a plan view showing the protective sheet and the tab stack used in the electric storage device of the present disclosure.
Figure 7C:
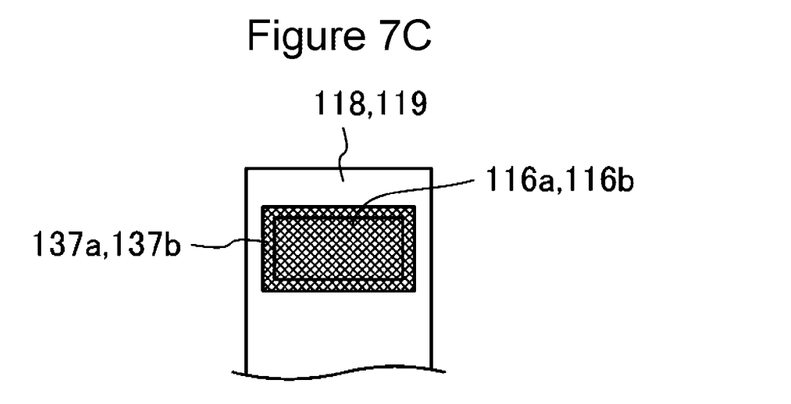
FIG. 7C is a plan view showing the protective sheet and the tab stack used in the electric storage device of the present disclosure.

FIGS. 7A to 7C are diagrams showing three embodiments, and more specifically schematic diagrams showing the shapes of the joint region 117*a* 117*b*, 127*a*, 127*b*, 137*a* and 137*b* formed in the protective sheets 116*a* and 116*b* joined to the first tab stack 118 and the second tab stack 119.

In the electric storage device 100, in the above connecting step, the first tab stack 118 and the second tab stack 119 have contact surfaces (one surfaces) that come into contact with the positive electrode first current collecting plate 151*a* and the negative electrode first current collecting plate 152*a*, and back surfaces (the other surfaces) provided on the opposite side of the contact surfaces, and protective sheets 116a and 116b having conductivity are disposed on and joined to the back surfaces. Corners 116a1, 116b1 exist at the edge of the protective sheet 116a, 116b. In the protective sheet 116a, 116b, joint regions 117a, 117b, 127a, 127b, 137a, 137b joined to the back surface are formed so as to include the corners 116a1, 116b1. In these embodiments, the protective sheets 116a and 116b are substantially rectangular, and there are four corners 116a1, 116b1. With this configuration, the corners 116a1, 116b1 are joined to the first tab stack 118, the second tab stack 119. Therefore, when, in the connecting step, in the protective sheet 116a, 116b pressed by the welding jig 159, the region not in contact with the welding jig 159 bends and warps in the direction away from the first tab stack 118, the second tab stack 119, the protrusion of the corners 116a1, 116b1, which are closest to the electrode body in the warped part, can be suppressed. Therefore, the protruding height (distance from the first tab stack 118, the second tab stack 119) of the warped portion can be reduced, and it is possible to suppress short-circuiting due to contact between the protective sheet 116a, 116b and the electrode body 110.

In the example of FIG. 7A, the protective sheet 116a, 116b is substantially rectangular, welding is performed at the corners 116a1, 116b1 located at the four corners of the protective sheet 116a, 116b, and the joint regions 117a, 117b exist independently at the four corners. In the example of FIG. 7B, the entire back surface of the protective sheet 116a, 116b is the joint region 127a, 127b. In the example of FIG. 7C, the joint region 137a, 137b extends over the entire back surface of the protective sheet 116a, 116b and to the outside thereof.

In the joint region 117a, 117b, 127a, 127b, 137a, 137b, a plurality of protrusions and recesses may be formed in the back surface of the protective sheet 116a, 116b, which is the surface opposite to the surface in contact with the first tab stack 118, the second tab stack 119.

The part of the back surface (the other surface) of the first tab stack 118, the second tab stack 119 that is joined to the protective sheet 116a, 116b may be recessed more than the part not joined.

The joint region 127a, 127b, 137a, 137b may include the entire edge of the protective sheet 116a, 116b. In this case, the entire edge of the protective sheet 116a or 116b is joined to the first tab stack 118 or the second tab stack 119. With this configuration, alignment for bringing the welding jig 159 into contact with the corners 116a1, 116b1 is facilitated compared with the method in which the welding jig 159 is brought into contact with only the corners of the edge of the protective sheet to form the joint regions 117a, 117b (see FIG. 7A). In addition, since the vicinities of the corners to be joined can also be joined, joining can be performed with higher reliability.

In FIGS. 7B and 7C, the joint region 127a, 127b, 137a, 137b includes the entire surface of the protective sheet 116a, 116b on the side opposite the surface facing the first tab stack 118. With this configuration, the configuration of the welding jig 159 can be simplified because if a welding jig 159 having a contact surface of the same size as the protective sheet 116a, 116b or a welding jig 159 having a contact surface larger than the protective sheet 116a, 116b is used, welding can be performed while easily pressing the corners of the protective sheet 116a, 116b.

The entire edge of the protective sheet 116a, 116b may be inside the edge of the first tab stack 118 or the second tab stack 119. With this configuration, in the connecting step, the effect of more surely suppressing the warping of the corners of the protective sheet 116a, 116b can be obtained remarkably by using one welding jig 159 for the protective sheet 116a, 116b as compared with the configuration in which the edge of the protective sheet 116a, 116b is outside the edge of the first tab stack 118 or the second tab stack 119, that is, the configuration in which a part of the protective sheet 116a, 116b extends to the outside of the first tab stack 118 or the second tab stack 119. Further, it is possible to prevent the entire device from being increased in size by the protective sheet 116a, 116b extending from the tip part of the first tab stack 118, the second tab stack 119.

In the first tab stack 118, the second tab stack 119, the contact surface faces the lid 130 with the positive electrode current collector 151, the negative electrode current collector 152 therebetween, and the back surface of the first tab stack 118, the second tab stack 119 is bent so as to face the electrode body 110. This configuration makes it possible to reduce the ratio of the first tab stack 118 and the second tab stack 119 to the space between the lid 130 and the electrode body 110 as compared with the configuration in which the tip ends of the first tab stack 118 and the second tab stack 119 extend from the electrode body 110 to the lid 130.

The protective sheets 116a and 116b used in the electric storage device 100 may be made of the same material as that of the first tab stack 118 and the second tab stack 119. Therefore, they may be made of, for example, aluminum or copper. The thickness of the protective sheet 116a, 116b is preferably larger than the thickness of the tab 111b, 112b because the first tab stack 118, the second tab stack 119 can be reliably protected. When the thickness of the protective sheet 116a, 116b is larger than the predetermined value, even if the protective sheet 116b, 116b is pressed with a horn having a larger opposing area than the protective sheet 116b, 116b at the time of joining, the step between the protective sheet pressed by the horn and sunk into the tab stack and the exposed part of the tab stack is maintained, and the horn is not in contact with the exposed part of the tab stack. Therefore, the thickness of the protective sheet 116a, 116b may be 20 to 200 μm. The thickness of each tab constituting the first tab stack 118 and the second tab stack 119 may be 15 μm or less. Also, the shape of the protective sheet of the present disclosure may be rectangular. However, the shape of the protective sheet is not limited to this shape, and may be triangular or oval. In the case of an oval shape, a part of the edge where the straight part and the curved part are connected or a part of the curved part of the edge that is farthest from the center of the protective sheet may be a corner. The joint region may include a region on the back surface of the tab stack that does not face the protective sheet. It is not necessary to provide joint regions at all of the corners among the plurality of corners formed on the protective sheet.

The electric storage device 100 is further provided with a resin current collector holder 190 having an insulating portion 191 interposed between the positive electrode first current collecting plate 151a and the lid 130 and an insulating portion interposed between the positive electrode second current collecting plate 151b and the inverting plate 162.

The positive electrode second current collecting plate 151b is supported by a support insulating portion. The support insulating portion is engaged with the insulating plate 183. With this configuration, the positive electrode current collector 151 is fixed to the lid 130. In the support insulating portion, a plurality of claws that nip the outer peripheral surface of the conductive member 161 are provided on the back surface opposite to the surface facing the positive electrode second current collecting plate 151*b*, and an engaging portion standing toward the lid 130 is provided on the edge of the back surface. By engaging this engaging portion with the insulating plate 183, the current collector holder 190 is fixed to the lid 130 with the insulating plate 183 therebetween. A hole is formed in the support insulating portion, and the protrusion 162*a* of the inverting plate 162 and the positive electrode second current collecting plate 151*b* are connected through the hole. The support insulating portion has a fixing portion protruding so as to be inserted into a hole provided around the hole 51*b* of the positive electrode second current collecting plate 151*b*. After the fixing portion is inserted into the hole, the part of the fixed portion passing through the hole is deformed by thermal caulking, whereby the positive electrode second current collecting plate 151*b* is fixed to the support insulating portion.

The positive electrode first current collecting plate 151*a* and the insulating portion 191 are disposed so as to face the injection hole.

A hole 51*a* is formed in the positive electrode first current collecting plate 151*a*. A hole 191*a* is also formed in the insulating portion 191 at a position corresponding to the hole 51*a*. A cylindrical portion 191*b* extending from the lid 130 side toward the electrode body 110 side is formed in the opening of the hole 191*a*. The cylindrical portion 191*b* is provided so as to pass through the hole 51*a*. The insulating portion 191 and the positive electrode first current collecting plate 151*a* are disposed such that the injection hole is disposed inside the sidewall of the cylindrical portion 191*b*.

By the cylindrical portion 191*b*, when the first tab stack 118 is joined to the positive electrode first current collecting plate 151*a*, the tip of the first tab stack 118 can be prevented from accidentally entering the opening of the hole 51*a*. The first tab stack 118 can be prevented from covering the hole 51*a* or the injection hole.

Among the openings at both ends of the cylindrical portion 191*b*, the opening on the side of the electrode body 110 is provided with an obstacle member interposed between the electrode body 110 and the injection hole and connected to the cylindrical portion 191*b*. With this configuration, when the electrolyte is supplied through the injection hole, the electrolyte passing through the cylindrical portion 191*b* hits the obstacle member, and the electrolyte can flow into the outer casing 120 in a state where the flow rate of the electrolyte is lowered. By lowering the flow rate of the electrolyte, it is possible to suppress damage to the electrode body 110 that the electrolyte hits in the outer casing 120.

Specific examples of damage to the electrode body 110 are as follows. In the case of the electrode body 110 in which the stacking direction of the positive electrode plates, the negative electrode plates and the separators is parallel to the lid, the edges of the stacked positive electrode plates, negative electrode plates, and separators are positioned at the upper end of the electrode body 110. When the electrolyte hits the edges, the separators bonded to the electrode plates peel off from the electrode plates and the active material layers of the positive and negative electrode plates slide down.

The hole 191*a* is, for example, an oval. With this configuration, a flat portion is formed on the side wall of the cylindrical portion extending along the shape of the opening of the hole 191*a*. When the first tab stack 118 is joined to the positive electrode first current collecting plate 151*a*, the flat portion is brought into contact with the first tab stack 118 before joining, whereby the arrangement of the first tab stack 118 before joining can be stabilized.

Other Embodiments

The embodiments described above are examples of the present invention, and the present invention is not limited to these examples, and these examples may be combined with or partially replaced with well-known techniques, conventional techniques, or known techniques. Also, modified inventions which can be easily conceived by those skilled in the art are also included in the present invention.

It is not necessary that the protective sheet is disposed on one surface of the first or second tab stack and the first or second current collector is connected to the other surface of the first or second tab stack. For example, the protective sheet may be disposed on one surface of a first or second tab, and the first or second current collector may be connected to the other surface of the first or second tab.

In the above-described embodiment, the protective sheet is provided on the tab of both the positive electrode and the negative electrode, but the protective sheet may be provided only on the positive electrode side or only on the negative electrode side.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An electric storage device comprising:
    an electrode body including a plurality of first electrode plates and a plurality of second electrode plates;
    a first electrode output terminal and a second electrode output terminal;
    a first current collector electrically connecting the first electrode plates and the first electrode output terminal; and
    a second current collector electrically connecting the second electrode plates and the second electrode output terminal,
    wherein the first electrode plates have first tabs that protrude from the electrode body and have conductivity and are connected to the first current collector,
    wherein the first tabs are stacked to form a first tab stack, one surface of the first tab stack is in contact with the first current collector, and a first protective sheet is disposed on and in contact with the other surface on the side opposite to the one surface,
    wherein on the periphery of the first protective sheet, there is a corner formed by two adjacent sides,
    wherein at least the corner of the first protective sheet is joined to the first tab stack, and
    wherein a plurality of protrusions and recesses are formed on a surface of the first protective sheet on the side opposite to the surface in contact with the first tab stack.

2. The electric storage device according to claim 1, wherein the entire periphery of the first protective sheet is joined to the first tab stack.

3. The electric storage device according to claim 1, wherein the thickness of the first protective sheet is larger than the thickness of the first tabs.

4. The electric storage device according to claim 1, wherein the entire surface of the first protective sheet is joined to the first tab stack.

5. The electric storage device according to claim 1, wherein a portion of the other surface of the first tab stack that is joined to the first protective sheet is recessed as compared with other portions.

6. The electric storage device according to claim 1, wherein the first protective sheet is disposed inside the periphery of the first tab stack on the other surface of the first tab stack.

7. The electric storage device according to claim 1, wherein the first tab stack is bent so that the first protective sheet faces the electrode body.

8. The electric storage device according to claim 1,
wherein the second electrode plates have second tabs that protrude from the electrode body and have conductivity and are connected to the second current collector,
wherein the second tabs are stacked to form a second tab stack, one surface of the second tab stack is in contact with the second current collector, and a second protective sheet is disposed on and in contact with the other surface on the side opposite to the one surface,
wherein on the periphery of the second protective sheet, there is a corner formed by two adjacent sides,
wherein at least the corner of the second protective sheet is joined to the second tab stack, and
wherein a plurality of protrusions and recesses are formed on a surface of the second protective sheet on the side opposite to the surface in contact with the second tab stack.

9. An electric storage device comprising:
an electrode body including a first electrode plate and a second electrode plate;
a first electrode output terminal and a second electrode output terminal;
a first current collector electrically connecting the first electrode plate and the first electrode output terminal; and
a second current collector electrically connecting the second electrode plate and the second electrode output terminal,
wherein the first electrode plate has a first tab that protrudes from the electrode body and has conductivity and is connected to the first current collector,
wherein the second electrode plate has a second tab that protrudes from the electrode body and has conductivity and is connected to the second current collector,
wherein one surface of the first tab is in contact with the first current collector, and a first protective sheet is disposed on and in contact with the other surface on the side opposite to the one surface,
wherein one surface of the second tab is in contact with the second current collector, and a second protective sheet is disposed on and in contact with the other surface on the side opposite to the one surface,
wherein on the periphery of each of the first protective sheet and the second protective sheet, there is a corner formed by two adjacent sides,
wherein at least the corner of the first protective sheet is joined to the first tab
wherein at least the corner of the second protective sheet is joined to the second tab,
wherein a plurality of protrusions and recesses are formed on a surface of the first protective sheet on the side opposite to the surface in contact with the first tab, and
wherein a plurality of protrusions and recesses are formed on a surface of the second protective sheet on the side opposite to the surface in contact with the second tab.

* * * * *